United States Patent [19]

Seach

[11] Patent Number: 5,699,990

[45] Date of Patent: Dec. 23, 1997

[54] HOLDER FOR EYEGLASSES

[76] Inventor: Eugene Seach, 2379 Henn-Hyde Rd., NE., Warren, Ohio 44484

[21] Appl. No.: 445,224

[22] Filed: May 18, 1995

[51] Int. Cl.$^6$ .................................................. A47F 5/00
[52] U.S. Cl. .................................... 248/309.1; 24/3.3
[58] Field of Search ............................. 248/902, 309.1, 248/316.1, 316.7; 24/3.3, 3.8, 3.9; 211/113

[56] References Cited

U.S. PATENT DOCUMENTS

| | | | |
|---|---|---|---|
| 2,656,917 | 10/1953 | Hollis | 248/902 X |
| 4,239,167 | 12/1980 | Lane. | |
| 4,452,354 | 6/1984 | Tabachnick. | |
| 4,771,515 | 9/1988 | Guarro. | |
| 5,000,410 | 3/1991 | Beavers. | |
| 5,129,617 | 7/1992 | MacWilliamson | 24/3.3 X |
| 5,340,074 | 8/1994 | Porcaro et al. | 248/309.1 |

*Primary Examiner*—Joanne Silbermann
*Attorney, Agent, or Firm*—Harpman & Harpman

[57] ABSTRACT

A holder for eyeglasses that can be mounted in a variety of configurations to secure and hold eyeglasses in folded vertical aligned engagement including a contoured front panel portion having a thin flexible backing element that is only partially attached to the front panel. An engagement slot within the front panel portion receives and resiliently holds the eyeglasses between the front panel and the resilient backing element.

2 Claims, 3 Drawing Sheets

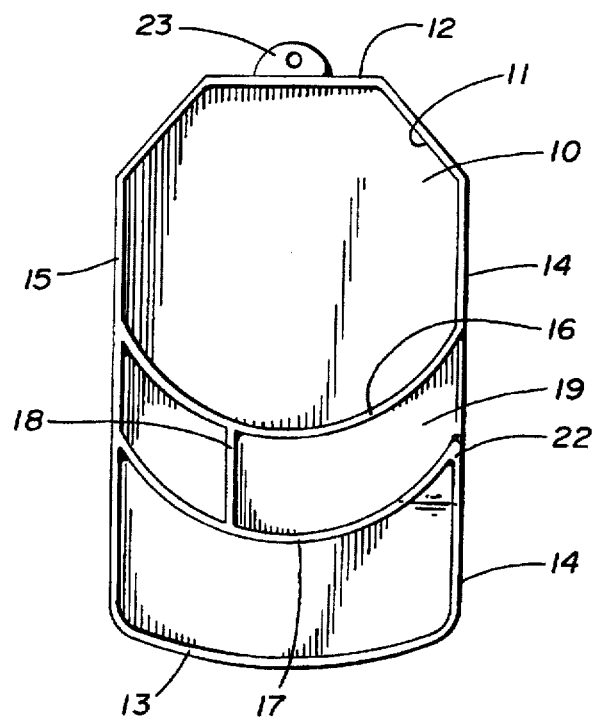
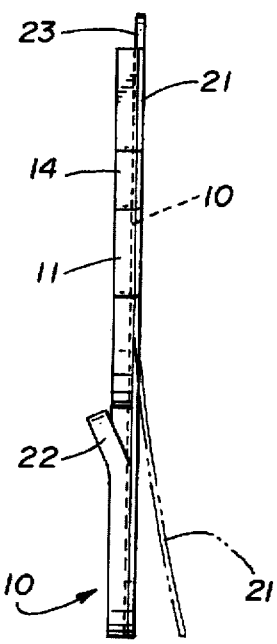
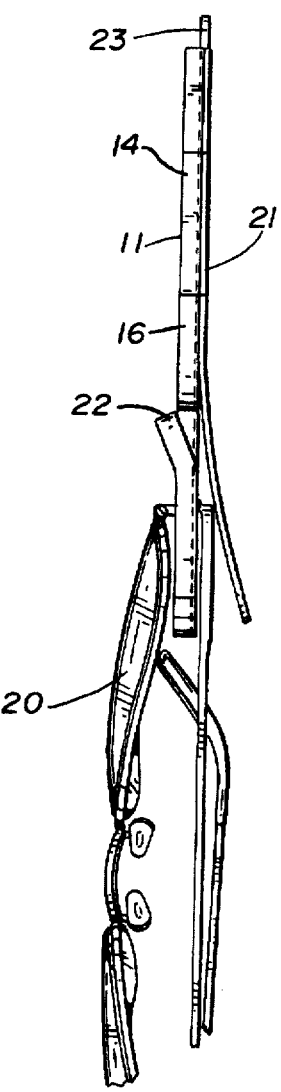
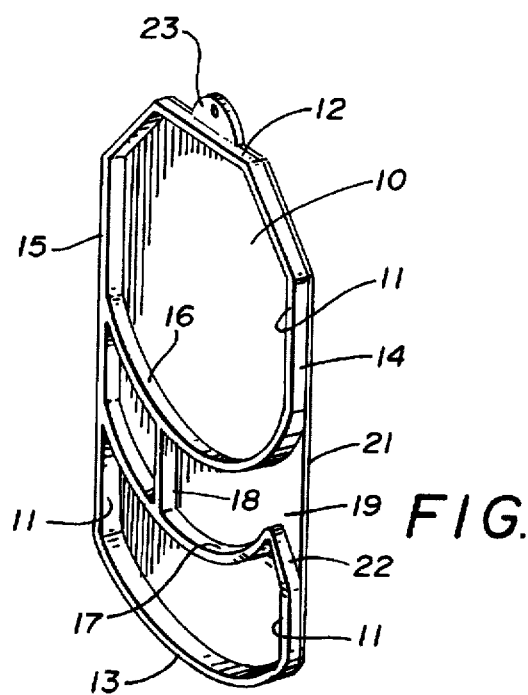
FIG. 1
FIG. 2
FIG. 3
FIG. 4

HOLDER FOR EYEGLASSES

BACKGROUND OF THE INVENTION

1. Technical Field

This invention relates to eyeglass holders and the like used to temporarily hold and secure eyeglasses that will allow for quick and easy positioning and access to the glasses in vehicle environments where drivers attention should be directed to the road at all times.

2. Description of Prior Art

Prior art devices of this type have relied on a variety of different design configurations to hold eyeglasses for easy access. Typically, prior art eyeglass holders are inconvenient and while holding the eyeglasses must be placed somewhere within the vehicle making retrieval of the holder difficult given the limited storage space available to the driver while driving. Selected attempts to solve this problem in eyeglass storage in general can be see in U.S. Pat. Nos. 5,340,074, 5,000,410, 4,771,512, 4,452,354 and 4,239,167.

In U.S. Pat. No. 5,340,047 an eyeglass display case is disclosed that is directed to holding and displaying glasses for retail sales. It illustrates an apertured panel through which the ear piece of the eyeglass is inserted.

U.S. Pat. No. 5,000,410 shows an eyeglass holder for automobiles that has an animal configuration with an extended fold over flap that engages the ear pieces of the eyeglass and graphically represents an animals tail.

U.S. Pat. No. 4,771,515 claims an eyeglass pocket insert holder that secures the eyeglasses within a shirt pocket.

An eyeglass holder is illustrated in U.S. Pat. No. 4,452,354 that provides a tubular sleeve of flexible plastic material through which the eyeglass ear piece is inserted.

In U.S. Pat. No. 4,239,167 a wall mounted eyeglass holder is shown wherein a bracket is formed out of a body panel to receive and suspend the glasses therein.

Finally, in U.S. Pat. No. 3,148,812 a holder for spectacles is illustrated that forms a folded loop about the eyeglass positioned therethrough.

SUMMARY OF THE INVENTION

A holder for eyeglasses that can be selectively positioned in a multiplicity of locations within the interior portion of an automobile in reach of the driver. The holder of the invention secures the eyeglasses in a folded vertical position by resiliently engaging a portion of the ear piece between a non-yielding contoured support panel portion and a flexible back panel portion suspended from alternate support and attachment elements to the vehicle.

DESCRIPTION OF THE DRAWINGS

FIG. 1 is a front elevational view of the eyeglass holder of the invention;

FIG. 2 is a side elevational view of the eyeglass holder;

FIG. 3 is a side elevational view of the eyeglass holder with the eyeglasses positioned within;

FIG. 4 is a perspective view of the eyeglass holder;

DESCRIPTION OF THE PREFERRED EMBODIMENT

Figure 5:
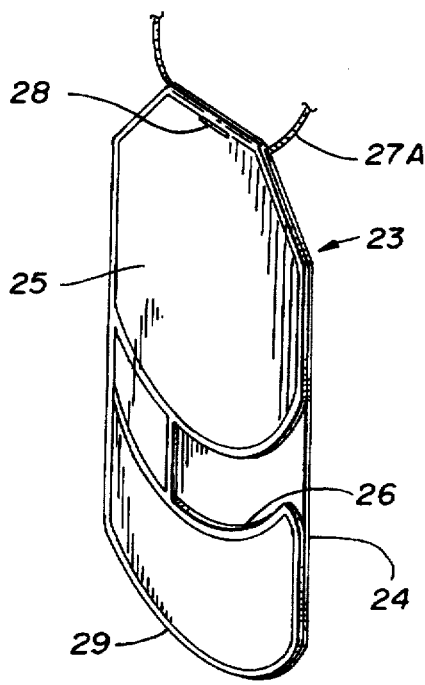
FIG. 5 is a perspective view of an alternate form of the eyeglass holder.

Referring to FIGS. 1-4 of the drawings, a holder for eyeglasses can be seen having a flat generally rectangular main body member 10 with upstanding perimeter edges 11 defining oppositely disposed top 12 and bottom 13 and parallel sides 14 and 15 with interconnecting upstanding support ridges 16, 17, and 18 thereon. The support ridges 16, 17, and 18 define an arcuate notch opening at 19 therebetween to receive and hold eyeglasses 20 as will be described in more detail hereinafter. A thin resilient backing element 21 of a generally overall matching dimension to that of the main body member 10 is secured thereto about an upper portion of the main body member defined by upstanding perimeter edge 11 and interconnecting corresponding ridge 16, best illustrated in FIG. 2 of the drawings and indicated at 22.

The backing element 21 so attached can be displaced from the lower portion of the main body member 10 given its resilient nature as illustrated in FIG. 2 of the drawings in broken lines by insertion of the eyeglasses 20 into the notched opening at 19 as best seen in FIG. 3 of the drawings. To facilitate eyeglass insertion into the notch area 19 the main body member 10 has an angularly offset outwardly extending portion 22. This offset portion 22 includes the side 14 upstanding perimeter edges 11 and upstanding support ridge 17, best seen in FIGS. 2, 3, and 4 of the drawings. An apertured tab 23 extends from the top 12 to provide a point of attachment from which eyeglass holder of the invention can be suspended as will be well understood by those skilled in the art.

Figure 6:
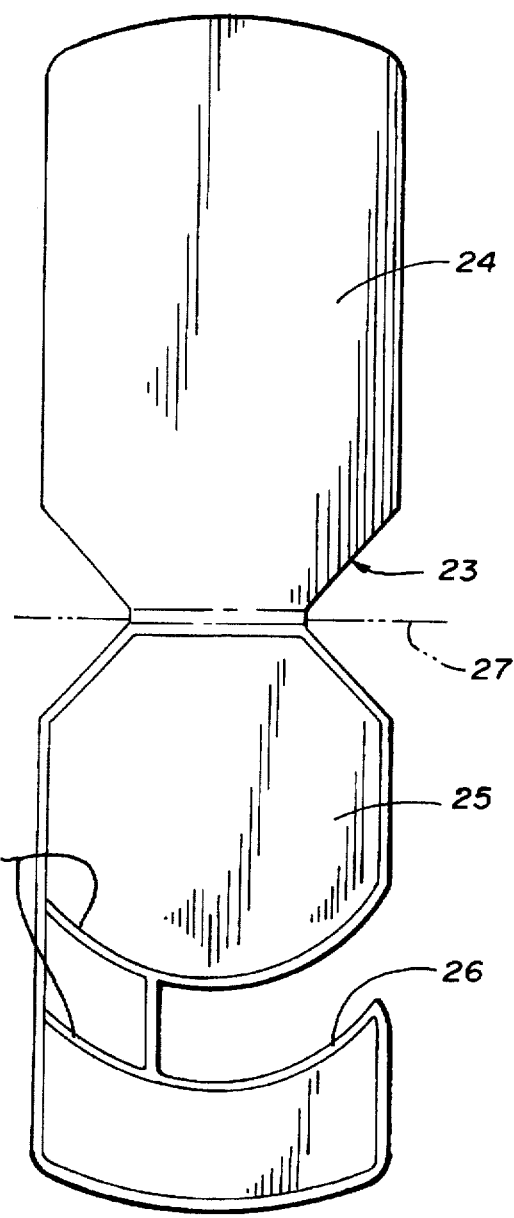
FIG. 6 is a front elevational view of the alternate form of the eyeglass holder shown in FIG. 5 in non-folded position.

Referring to FIGS. 5-6 of the drawings, an alternate form of the invention can be seen that is formed from a pre-cut cardboard blank 23. The blank 23 has a backing portion 24 and an eyeglass engagement portion 25 with an arcuate notch 26 of a similar dimension as that of hereinbefore described notch 19 in the preferred embodiment of the invention within.

It will be evident from viewing FIG. 5 and the specific shape of the pre-cut blank 23 that the blank's backing area 24 is folded over against and behind the eyeglass engagement portion 25 along a fold line 27 at an area of reduced transverse dimension therebetween enclosing a hanging strap 27A.

The respective backing and engagement portions 24 and 25 can be secured together by a single fastening means 28 or alternately bonded to one another by adhesive or the like except for the area defined by the notch 26 and therebelow. Surface perimeter indecia lines 29 on the eyeglass engagement portion 25 are provided to emulate visual impact of the preferred form of the invention shown in FIGS. 1-4 of the drawings.

Figure 7:
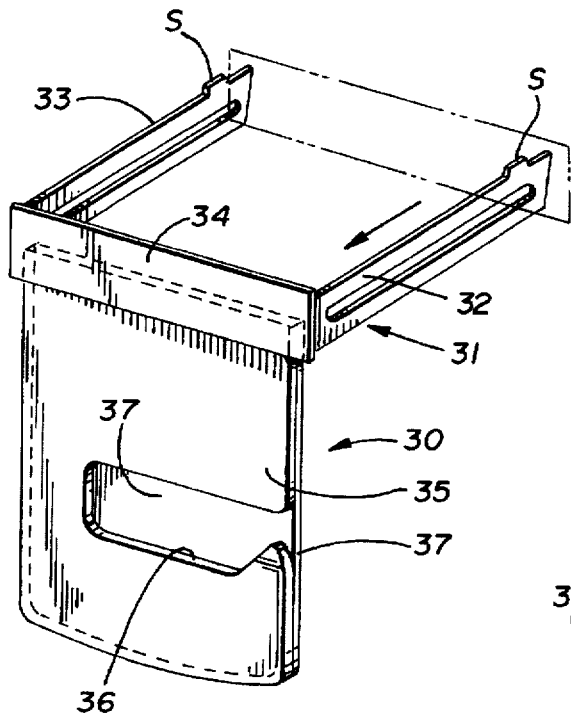
FIG. 7 is a perspective view of a second alternate form of the invention.
Figure 8:
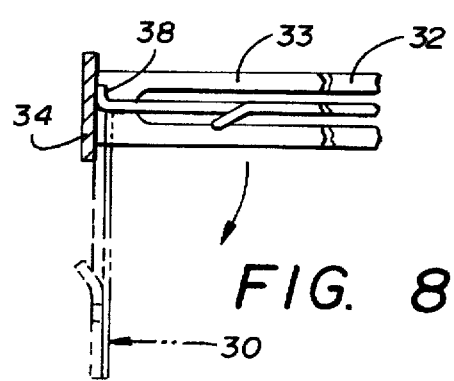
FIG. 8 is a side elevational view of the alternate form of the invention shown in FIG. 7.

A second alternate form of the invention can be seen in FIGS. 7 and 8 of the drawings wherein a fold out eyeglass holder 30 has a retractable support frame 31 defined by a pair of slotted extension arms 32 and 33 and an interconnected front bracket 34 therebetween with stops S formed on the respective arms adjacent their free ends.

The eyeglass holder 30 has a rigid face portion 35 of a generally flat square configuration with an engagement notch 36 and a thin resilient backing plate 37 secured partially thereto. A hinged configuration 38 connects the eyeglass holder 30 to the inner surface of the face bracket 34 so as to allow same to hinge downwardly from a storage position illustrated in FIG. 8 to an operational position shown in broken lines and also seen in FIG. 7 in solid lines.

Figure 9:
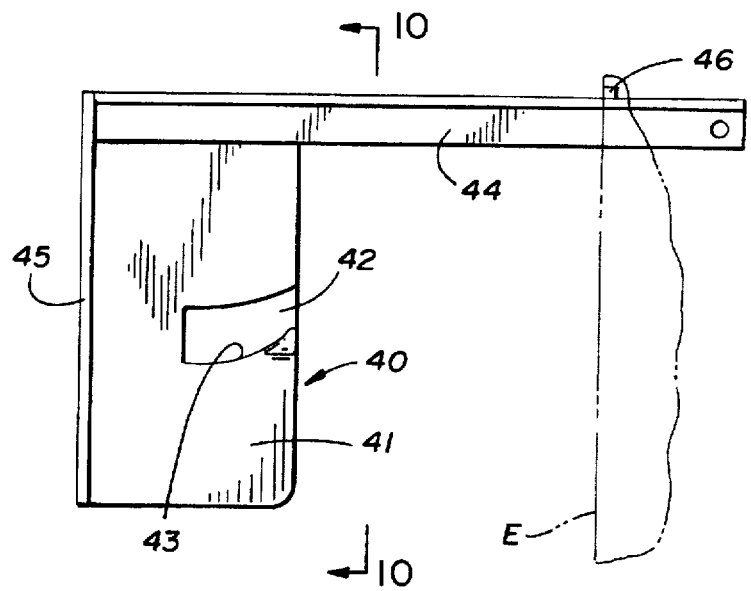
FIG. 9 is a side elevational view of a third alternate form of the invention.
Figure 10:
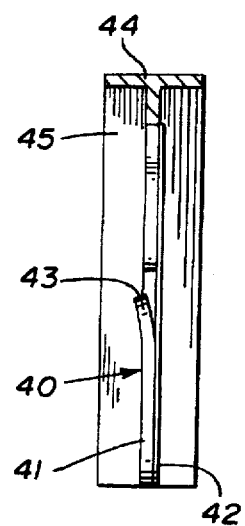
FIG. 10 is a cross-sectional view on lines 10—10 of FIG. 9.
Figure 11:
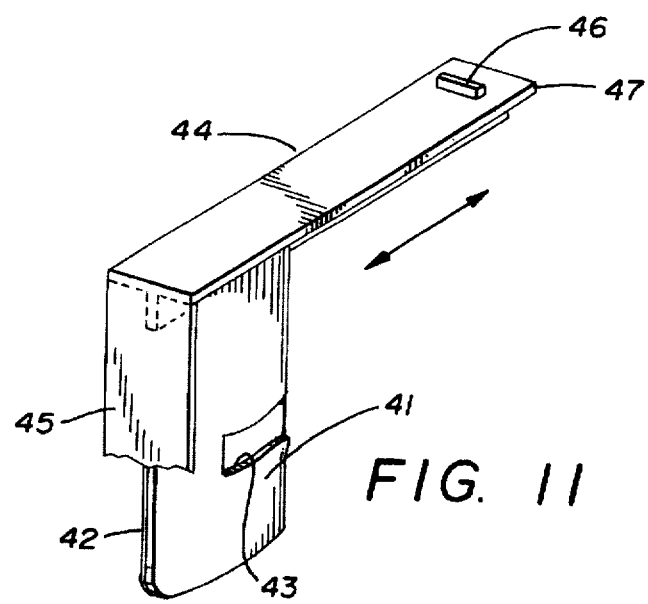
FIG. 11 is a perspective view of the alternate form of the invention shown in FIGS. 9 and 10.

Referring now to FIGS. 9-11 of the drawings a fourth alternate form of the invention can be seen wherein a generally rectangular eyeglass holder 40 has a rigid front face 41 and a thin resilient backing 42 with an access notch 43 therein. The eyeglass holder 40 is suspended from an elongated T-shaped movable support element 44 with a cover plate 45 extending therefrom. A stop 46 is formed on the upper portion of the T-shaped support element inwardly of its end 47 with an associated enclosure E generally indicated by the broken lines in FIG. 9 of the drawings into which the structure can be retracted.

It will be evident from the above description that in use all three of the alternate forms of the invention operate in the same manner wherein the inserting of an ear piece of the glasses 20 deflects the backing allowing access to the notch and holding the glasses in place. It will be apparent to those skilled in the art that various changes and modifications may be made therein without departing from the spirit of the invention.

Therefore I claim:

1. An eye glass holder for supporting a pair of eye glasses in a removable secured relation thereto comprises; a generally rectangular substantially rigid planar supporting body member having a perimeter edge, a portion of the perimeter edge defining a notch extending inwardly from adjacent perimeter edge portions, a resilient backing member integrally secured to a portion of said support body member adjacent said notch, said resilient backing member defining selective access to the notch in said supporting body member by deformation of a portion of said resilient backing member overlying said notch, one of said adjacent perimeter edge portions having an angular offset outwardly extending portion therefrom.

2. The eyeglass holder of claim 1 wherein said supporting body member has upstanding integral perimeter edges thereabout defining spaced recess areas adjacent the notched area.

* * * * *